(12) United States Patent
Girard

(10) Patent No.: US 9,230,369 B2
(45) Date of Patent: Jan. 5, 2016

(54) DYNAMIC OBSTACLE AVOIDANCE FOR CROWD SIMULATION USING LANE COORDINATES

(75) Inventor: Michael Girard, Palo Alto, CA (US)

(73) Assignee: AUTODESK, INC., San Rafael, CA (US)

(*) Notice: Subject to any disclaimer, the term of this patent is extended or adjusted under 35 U.S.C. 154(b) by 353 days.

(21) Appl. No.: 13/562,183

(22) Filed: Jul. 30, 2012

(65) Prior Publication Data

US 2013/0035916 A1 Feb. 7, 2013

Related U.S. Application Data

(60) Provisional application No. 61/513,985, filed on Aug. 1, 2011.

(51) Int. Cl.
*G06T 19/20* (2011.01)

(52) U.S. Cl.
CPC .............. *G06T 19/20* (2013.01); *G06T 2210/21* (2013.01); *G06T 2219/2004* (2013.01)

(58) Field of Classification Search
CPC ......... G06T 13/40; G06T 13/20; G06T 13/00; A63F 13/10; A63F 2300/6607
See application file for complete search history.

(56) References Cited

U.S. PATENT DOCUMENTS

| | | | |
|---|---|---|---|
| 2003/0184603 A1 | 10/2003 | Marshall et al. | |
| 2009/0306946 A1* | 12/2009 | Badler et al. | ........................ 703/2 |
| 2010/0091018 A1 | 4/2010 | Tatarchuk et al. | |
| 2010/0134500 A1 | 6/2010 | Chang | |
| 2010/0141666 A1* | 6/2010 | Christopher et al. | ......... 345/520 |
| 2010/0299065 A1 | 11/2010 | Mays | |
| 2010/0301555 A1 | 12/2010 | Jubinville et al. | |
| 2011/0161060 A1* | 6/2011 | Kim et al. | ........................ 703/2 |

OTHER PUBLICATIONS

Reynolds C. W.: Flocks, herds, and schools: A distributed behavioral model. Proc. SIGGRAPH 87, Computer Graphics 21, 4 (Jul. 1987), 25-34.
Shao W., Terzopoulos D.: Autonomous pedestrians., In Proc. Symposium on Computer Animation (2005), pp. 19-28.
Lee K. H., Choi M. G., Hong Q., Lee J.: Group behavior from video: a data-driven approach to crowd simulation, Proceedings of the 2007 ACM SIGGRAPH/Eurographics symposium on Computer animation, pp. 109-118.
Guy S. J., Chhugani J., Curtis S., Lin M. C., Dubey P., Manocha D.: Pledestrians: A least-effort approach to crowd simulation. In Symposium on Computer Animation (2010), ACM.
Van Den Berg J., Patil S., Sewall J., Manocha D., Lin M.: Interactive navigation of individual agents in crowded environments. Proc. of ACM Symposium on I3D (2008), 139-147.

(Continued)

*Primary Examiner* — Maurice L McDowell, Jr.
(74) *Attorney, Agent, or Firm* — Artegis Law Group, LLP

(57) ABSTRACT

One embodiment of the invention sets forth a technique for avoiding collisions between agents traversing different lanes of a multi-lane path in a crowd simulation. A perception data structure is maintained per agent that keeps track of the speeds and locations of neighboring agents in the crowd simulation. At each frame, the perception data structure corresponding to a particular agent is analyzed to identify any projected collisions. If the perception data structure indicates that the agent is projected to collide with another agent, then a collision avoidance operation is executed to avoid the collision.

20 Claims, 4 Drawing Sheets

(56) References Cited

OTHER PUBLICATIONS

Treuille A., Cooper S., Popovic Z.: Continuum crowds. Proc. of ACM SIGGRAPH (2006), 1160-1168.

Chenney S.: Flow tiles. Proc. 2004 ACM SIGGRAPH / Eurographics Symposium on Computer Animation (2004).

Guy S., Chhugani J., Kim C., Satish N., Lin, M. C., Manocha D., Dubey P.: Clearpath: Highly parallel collision avoidance for multi-agent simulation. Proc. of Symposium on Computer Animation (2009), 177-187.

Helbing D., Molnar P.: Social force model for pedestrian dynamics. Physical Review E 51 (May 1995), 4282.

Julien Pettré, Jan Ondřej, Anne-Hélène Olivier, Armel Crétual and Stéphane Donikian , Experiment-based Modeling, Simulation and Validation of Interactions between Virtual Walkers, Proceedings of the 2009 ACM SIGGRAPH/Eurographics Symposium on Computer Animation (SCA'09), 2009.

Jan Ondřej, Julien Pettré, Anne-Hélène Olivier and Stéphane Donikian, A Synthetic-Vision-Based Steering Approach for Crowd Simulation SIGGRAPH '10: ACM SIGGRAPH 2010 Papers, 2010.

Manfred Lau and James Kuffner. 2006. Precomputed Search Trees: Planning for Interactive Goal-Driven Animation: ACM SIGGRAPH / Eurographics Symposium on Computer Animation (SCA), 299-308.

Ulicny, B., Ciechomski, O., and Thalmann, D. 2004. Crowdbrush: Interactive authoring of real-time crowd scenes. In Proceedings of the 2004 ACM SIGGRAPH/Eurographics symposium on Computer animation, 243-252.

Sung, M., Gleicher, M., and Chenney, S. 2004. Scalable behaviors for crowd simulation. Computer Graphics Forum 23, 3, 519-528.

Mankyu Sung and Lucas Kovar and Michael Gleicher, 2005, Fast and accurate goal-directed motion synthesis for crowds, Proceedings of the 2005 ACM SIGGRAPH/Eurographics symposium on Computer animation.

Ju E., Choi M. G., Park M., Lee J., Lee K. H., Takahashi S.: Morphable crowds. ACM Trans. Graph. 29, 6 (2010), 140.

Non-final Office Action, U.S. Appl. No. 13/563,576, dated Apr. 16, 2014.

Non-final Office Action, U.S. Appl. No. 13/556,096, dated Sep. 26, 2014.

Non-Final Office Action with U.S. Appl. No. 13/563,547, dated Jun. 8, 2015.

* cited by examiner

DYNAMIC OBSTACLE AVOIDANCE FOR CROWD SIMULATION USING LANE COORDINATES

CROSS-REFERENCE TO RELATED APPLICATIONS

This application claims the priority benefit of Provisional U.S. Patent Application Ser. No. 61/513,985, filed Aug. 1, 2011, entitled "Crowd Simulation with Object Avoidance," the subject matter of which is hereby incorporated herein by reference.

BACKGROUND OF THE INVENTION

1. Field of the Invention

The invention relates generally to the field of computer animation and, more specifically, to dynamic collision avoidance for crowd simulation using lane coordinates.

2. Description of the Related Art

Crowd simulation is the process of simulating a crowd having a large number of animated characters placed in a computer-generated crowd area. For the characters in the crowd to appear realistic, crowd simulators typically provide algorithms that attempt to simulate movements of the characters in a realistic manner. Such movements include the characters in the crowd traversing pre-defined paths. Crowd simulators, however, do not account for characters in a crowd colliding with one another when traversing paths. Thus, characters in a crowd simulation often collide with one another when traversing intersecting paths.

Collisions between characters negatively impact the realism of the crowd simulation because humans, in real life, self-correct their motion to avoid these types of collisions. Therefore, simulations generated by a crowd simulator that do not account for collisions between the different characters in the simulations appear unrealistic.

As the foregoing illustrates, what is needed in the art is a technique that enables collisions between moving objects in a crowd simulation to be avoided.

SUMMARY OF THE INVENTION

One embodiment of the invention sets forth a method for avoiding collisions between a plurality of objects traversing a multi-lane path included in an animation. The method includes the steps of identifying a set of neighboring objects associated with a first object traversing a first lane of the multi-lane path, where each neighboring object in the set of neighboring objects traverses a particular lane of the multi-lane path and is within a pre-determined distance of the first object, and computing a different collision relationship between the first object and each neighboring object in the set of neighboring objects based on a speed of the first object and a speed of the neighboring object, where the collision relationship between the first object and a particular neighboring object indicates whether the first object is projected to collide with the particular neighboring agent. The method also includes the steps of determining, based on a first collision relationship between the first object and a first neighboring object in the set of neighboring agents, that the first object is projected to collide with the first neighboring object, and performing a collision avoidance operation to prevent the first object from colliding with the first neighboring object.

One advantage of the disclosed technique is that the motion of an agent in a crowd simulation is dynamically corrected based on the locations and speeds of neighboring agents on a multi-lane path. The agent, therefore, avoids collisions with the neighboring agents. Consequently, the simulation appears more realistic because the agents in the simulation appear to self-correct their movements based on predicted collisions.

BRIEF DESCRIPTION OF THE DRAWINGS

So that the manner in which the above recited features of the invention, can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
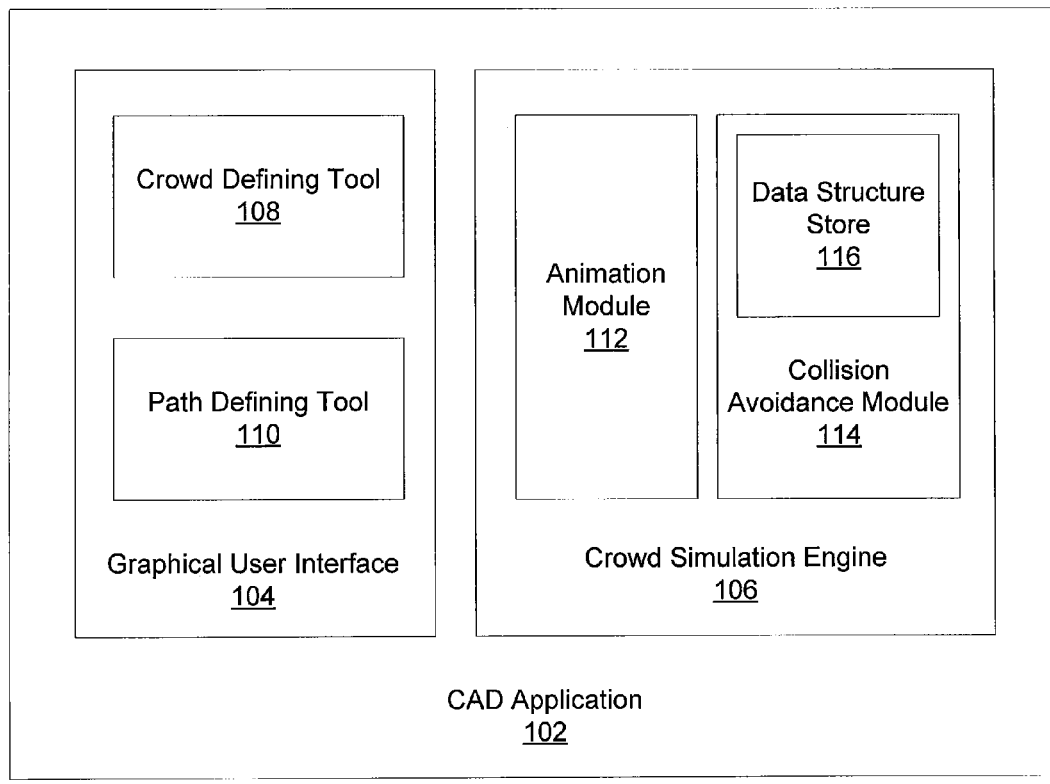
FIG. 1 is a block diagram of a software application configured to implement one or more aspects of the invention.

FIG. 1 is a block diagram of a software application configured to implement one or more aspects of the invention. As shown, CAD application 102 includes a graphical user interface (GUI) 104 and crowd simulation engine 106.

CAD application 102 is a software application that executes on a single computer system or on distributed systems communicating over computer networks such as local area networks or large, wide area networks, such as the Internet. Also, in one embodiment, CAD application 102 is provided as an application program (or programs) stored on computer-readable storage media such as a CD-ROM, DVD-ROM, flash memory module, or other tangible storage media.

GUI 104 included in CAD application 102 is an interface that allows a user to manipulate various interface elements (not shown) to define various aspects of a crowd being simulated. A simulated crowd includes a pre-defined area within which objects (referred to herein as "agents") are placed. The agents within a simulated crowd are animated, such that, when an animation of the simulated crowd is executed, the agents are in motion.

GUI 104 includes crowd defining tool 108 and path defining tool 110. Crowd defining tool 108 allows a user to provide values for different parameters associated with the crowd being simulated. The parameters include the size and shape of the area within which the crowd is to be placed (referred to here as the "crowd area"), the number of agents in the crowd, the types of movements that the agents should perform in the simulation and the length of the simulation. Any other parameters that define the crowd being simulated are within the scope of the invention. For each of the parameters, GUI 104 provides one or more UI elements (not shown) that a user manipulates to provide a value for the parameter. In one embodiment, the UI elements include one or more of slider bars, textual input boxes, radio buttons, check boxes and drawing elements.

Path defining tool 110 allows a user to define one or more paths within the crowd area. When an animation of the simulated crowd is executed, agents included the crowd traverse the paths defined by the user. A path includes one or more lanes, each lane having a pre-assigned flow direction, i.e., the direction in which agents traversing the lane move. The pattern of flow direction across multiple lanes of a multi-lane path is defined by the user. For example, in a four-lane path, lanes 1 and 3 have one flow direction and lanes 2 and 4 have the opposite flow direction. As another example, in a five-lane path, lanes 1-3 have one flow direction and lanes 4-5 have the opposite flow direction.

Crowd simulation engine 106 includes animation module 112 and collision avoidance module 114. Animation module 112 generates and executes a crowd simulation animation based on the parameters specified by the user via crowd defining tool 108 and the paths defined by the user via path defining tool 110. The crowd simulation animation includes a series of frames, each frame having a set of agents included in the crowd. Each agent in the crowd simulation animation is in motion and traverses one or more paths defined by the user via path defining tool 110. The path(s) a particular agent traverses is pre-determined and is referred to herein as "the planned path associated with the agent." In one embodiment, the planned path associated with an agent is determined by a user. In an alternate embodiment, the planned path associated with an agent is determined by the animation module 112 when the crowd simulation animation is executed.

Collision avoidance module 114 implements a collision avoidance technique to reduce the number of collisions between agents traversing lanes of multi-lane paths in the crowd simulation animation executed by animation module 112. The collision avoidance technique includes two phases, the perception phase and the avoidance phase. Both the perception phase and the avoidance phase are performed at each frame of the crowd simulation animation.

In the perception phase, collision avoidance module 114 generates a perception data structure corresponding to each agent in the current frame. The perception data structure corresponding to a particular agent identifies the agents that neighbor the particular agent. For each neighboring agent, the perception data structure also indicates whether the particular agent is projected to collide with a neighboring agent and, if so, a projected time of collision.

In operation, collision avoidance module 114 first determines, for each agent in the frame, the particular lane of a multi-lane path that the agent is currently traversing (referred to herein as the "lane assignment of the agent"). Collision avoidance module 114 then computes lane coordinates for each agent. The lane coordinates for the agent indicate the lane assignment of the agent and the distance that the agent has already traversed along the lane. Collision avoidance module 114 then generates, for each lane in the multi-lane path, a list of agents currently traversing the lane based on the lane coordinates associated with the agents. The list of agents is sorted based on the distance each agent has already traversed along the lane. In one embodiment, each agent in the frame is associated with an agent index, and the list of agents includes a list of agent indices.

To generate a perception data structure for a particular agent, Ai, traversing a given lane, Lk, collision avoidance module 114 identifies a set of neighboring agents associated with agent Ai. The set of neighboring agents include agents in front of agent Ai in lane Lk, agents behind agent Ai in lane Lk and agents in neighboring lanes. More specifically, collision avoidance module 114 analyzes the lists of agents traversing each lane in the multi-lane path to identify agents that are a pre-determined distance ahead or behind agent Ai in the same lane as agent Ai or in neighboring lanes. In one embodiment, collision avoidance module 114 compares the lane coordinates of agent Ai with each agent identifies in the lists of agents traversing each lane to identify agents that are pre-determined distance from agent Ai.

For each neighboring agent, collision avoidance module 114 determines the current speed and the current position of the neighboring agent based on the lane coordinates of the neighboring agent. Collision avoidance module 114 then determines whether each neighboring agent is projected to collide with agent Ai based on the current speed and position of the neighboring agent and the current speed and position of agent Ai. If the neighboring agent is projected to collide with agent Ai, then collision avoidance module 114 computes a projected collision time indicating when agent Ai is projected to collide with the neighboring agent. In one embodiment, the projected collision time is computed using the equation:

$$(\text{Dist\_Ai} - \text{Dist\_Neighbor})/(\text{Speed\_Ai} - \text{Speed\_Neighbor}) \quad \text{Equation 1}$$

In Equation 1, Dist_Ai is the distance agent Ai has traversed along the current lane, Dist_Neighbor is the distance the neighboring agent has traversed along the lane that the neighboring agent is traversing, Speed_Ai is the current speed of the agent Ai and Speed_Neighbor is the current speed of the neighboring agent.

Collision avoidance module stores the set, of neighboring agents and the current speeds, current positions and the projected collisions times associated with the neighboring agents in a perception data structure corresponding to agent Ai. In a similar manner, collision avoidance module 114 generates a perception data structure corresponding to each agent in the frame. Each perception data structure is stored in data structure store 116.

Once the perception data structures corresponding to each agent are generated, collision avoidance module 114 performs the avoidance phase of the collision avoidance technique based on the perception data structures. In the avoidance phase, for each agent in the frame, collision avoidance module 114 accesses the corresponding perception data structure to determine whether the agent is projected to collide with neighboring agents that are in front or behind the agent in the current lane. If the agent is projected to collide with a neighboring agent in front or behind the agent, then collision avoidance module 114 performs a collision avoidance operation to avoid the collision. The collision avoidance operation includes either modifying the speed of the agent or the lane of the agent. In one embodiment, collision avoidance module 114 performs the collision avoidance operation only when the projected time of collision is below a pre-determined threshold.

In operation, if the agent is projected to collide with a neighboring agent in front of the agent, collision avoidance module 114 determines whether the speed of the agent can be safely decreased to avoid the collision. The speed of the agent can be safely decreased if the resultant lower speed, which is equal to or less than the speed of the neighboring agent in front of the agent, does not cause a collision with a neighboring agent behind the agent. Similarly, if the agent is projected to collide with a neighboring agent behind the agent, collision avoidance module 114 determines whether the speed of the agent can be safely increased to avoid the collision. The speed of the agent can be safely increased if the resultant higher speed, which is equal to or greater than the speed of the neighboring agent behind the agent, does not cause a collision with a neighboring agent in front of the agent.

If the speed of the agent cannot be safely be increased or decreased, then collision avoidance module 114 determines whether the agent can pass into a neighboring lane without colliding with a neighboring agent in the neighboring lane. More specifically, for a particular neighboring agent specified in the perception data structure corresponding to the agent, collision avoidance module 114 determines if the time required to pass into the neighboring lane is less than the collision time specified by the perception data structure. If the time required to pass is less than the collision time, then the agent can safely pass into the neighboring lane. However, if the time required to pass is greater than the collision time, then the agent cannot safely pass into the neighboring lane. In such a scenario, collision avoidance module 114 determines whether the agent can safely pass into a different neighboring lane.

In one embodiment, collision avoidance module 114 attempts to safely modify the speed of the agent in the current lane before causing the agent to pass into a neighboring lane to avoid a projected collision. In other embodiments, collision avoidance module 114 randomly determines whether to attempt to safely modify the speed of the agent or cause the agent to pass into a neighboring lane to avoid a projected collision.

Collision avoidance module 114 performs the collision avoidance technique described above for each agent at every frame of the crowd simulation animation. As a result, agents in the crowd simulation animation avoid collisions with other agents traversing the same multi-lane path.

Figure 2:
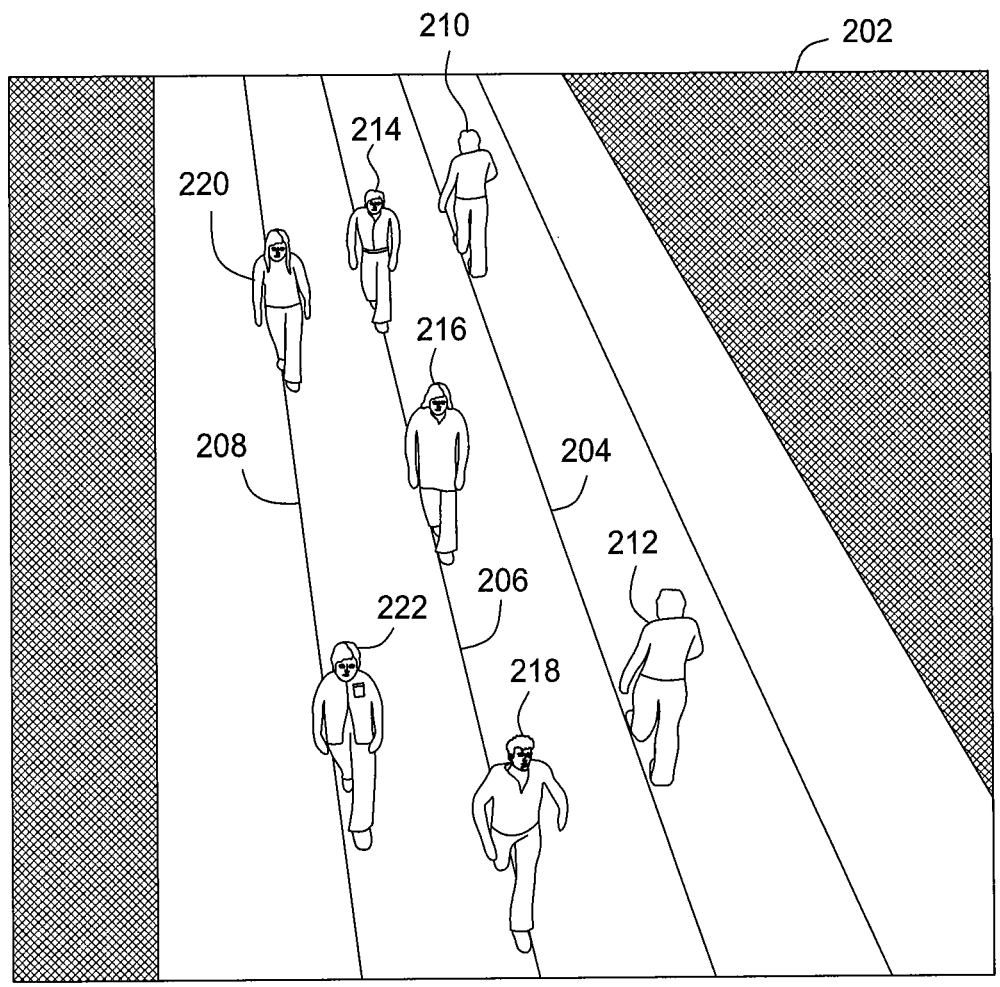
FIG. 2 illustrates a frame of a crowd simulation animation including agents traversing a multi-lane path, according to one embodiment of the invention.

FIG. 2 illustrates a frame 202 of a crowd simulation animation including agents traversing a multi-lane path, according to one embodiment of the invention. As shown, the multi-lane path in frame 202 includes lane 204, lane 206 and lane 208. Agents 210 and 212 are traversing lane 204, agents 214, 216 and 218 are traversing lane 206 and agents 220 and 222 are traversing lane 208.

In the perception phase of the collision avoidance technique, collision avoidance module 114 first determines the lane coordinates for each agent in frame 202. Collision avoidance module 114 then generates a perception data structure corresponding to each agent in the manner described above. Table 1 illustrates an exemplary perception data structure corresponding to agent 216 having lane coordinates (Lane 206, Dist_216) and a speed that is higher than all of the other agents in frame 202.

TABLE 1

| | Agent | Speed | Lane Coordinates | Collision? | Collision Time |
|---|---|---|---|---|---|
| Agent in Front in Lane 206 | 218 | Speed_218 | (206, Dist_218) | Yes | Time_A |
| Agent in Back in Lane 206 | 214 | Speed_214 | (206, Dist_214) | No | N/A |
| Agent in Front in Lane 208 | 222 | Speed_222 | (208, Dist_222) | Yes | Time_B |
| Agent in Back in Lane 208 | 220 | Speed_220 | (208, Dist_220) | No | N/A |

TABLE 1-continued

| | Agent | Speed | Lane Coordinates | Collision? | Collision Time |
|---|---|---|---|---|---|
| Agent in Front in Lane 204 | 212 | Speed_212 | (204, Dist_212) | Yes | Time_C |
| Agent in Back in Lane 204 | 210 | Speed_210 | (204, Dist_210) | No | N/A |

In the avoidance phase of the collision avoidance technique, collision avoidance module 114 accesses the perception data structure corresponding to each agent in frame 202 to determine whether any collision avoidance operations need to be performed. More specifically, if an agent in frame 202 is projected to collide with a neighboring agent, as specified by the perception data structure, then collision avoidance module 114 computes either a non-colliding speed for the agent or causes the agent to pass into a neighboring lane. For example, to avoid the collision between agent 216 and agent 218, collision avoidance module 114 computes a slower speed for agent 216 that avoids the collision between agent 216 and agent 218 and does not cause any other collisions. In one embodiment, the slower speed is equal to or less than the speed of agent 218.

Figure 3:
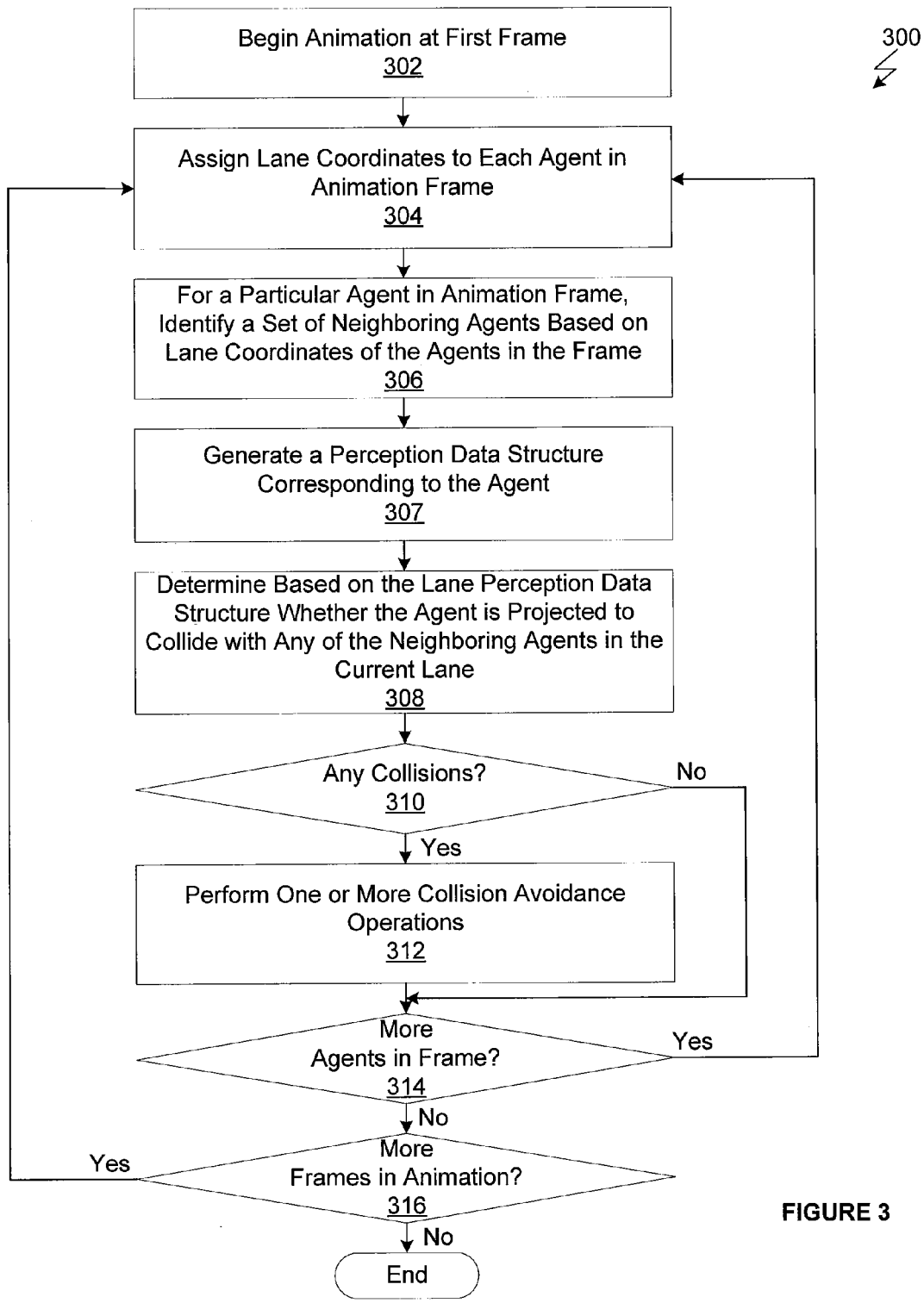
FIG. 3 is a flow diagram of method steps for avoiding object collisions in a crowd simulation animation, according to one embodiment of the invention.

FIG. 3 is a flow diagram of method steps for avoiding collisions on a multi-lane path in a crowd simulation animation, according to one embodiment of the invention. Although the method steps are described in conjunction with FIG. 2, persons skilled in the art will understand that any system configured to perform the method steps, in any order, falls within the scope of the present invention.

As shown, method 300 begins at step 302, where animation module 112 begins the execution of a crowd simulation animation at a first frame. At step 304, collision avoidance module 114 assigns lane coordinates to each agent in the current frame of the crowd simulation animation. The lane coordinates for a particular agent indicate the particular lane that the agent is currently traversing as well as the current location of the agent on the lane.

At step 306, for a particular agent, Ai, in given lane, Lk, collision avoidance module 114 identifies a set of neighboring agents associated with agent Ai based on the lane coordinates of agent Ai and the lane coordinates of the other agents in the frame. In one embodiment, a neighboring agent is an agent that is either a configurable distance in front or behind agent Ai in the current lane or a configurable distance in front or behind agent Ai in a neighboring lane.

At step 307, collision avoidance module 114 generates a perception data structure corresponding to agent Ai. The perception data structure includes, for each neighboring agent in the set of neighboring agent identified at step 306, an agent index identifying the neighboring agent and the current speed and position of the neighboring agent. The perception data structure also specifies a collision relationship between the agent Ai and each neighboring agent identified at step 306. The collision relationship between the agent Ai and a particular neighboring agent indicates whether agent Ai is projected to collide with the neighboring agent and, if so, the projected collision time of such a collision. For neighboring agents that are in neighboring lanes, the projected collision time, if any, indicates a time of collision between agent Ai and the neighboring agent had agent Ai been traversing the neighboring lane instead of the current lane. In one embodiment, collision avoidance module 114 uses Equation 1 above to determine whether agent Ai is projected to collide with a neighboring agent.

At step 308, collision avoidance module 114 determines whether agent Ai is projected to collide with a neighboring agent in the set of neighboring agents that is also traversing the current lane based on the perception data structure. At step 310, if agent Ai is projected to collide with another agent, then method 300 proceeds to step 312, where collision avoidance module 114 performs one or more collision avoidance operations. At step 314, if other agents exist in the current frame of the crowd simulation animation that have not been evaluated by collision avoidance module 114, then method 300 returns to step 304, which is performed for a next agent in the current frame. If, however, at step 314, no other agents exist in the current frame, then method 300 proceeds to step 316.

At step 316, if another frame exists of the crowd simulation animation, then method 300 returns to step 304, which is performed for a first agent in the next frame of the crowd simulation animation. If, however, at step 316, no other frames of the crowd simulation animation exist, then method 300 ends.

Returning now to step 310, if collision avoidance module 114 does not detect any collisions, then method 300 proceeds to step 314, described above.

Figure 4:
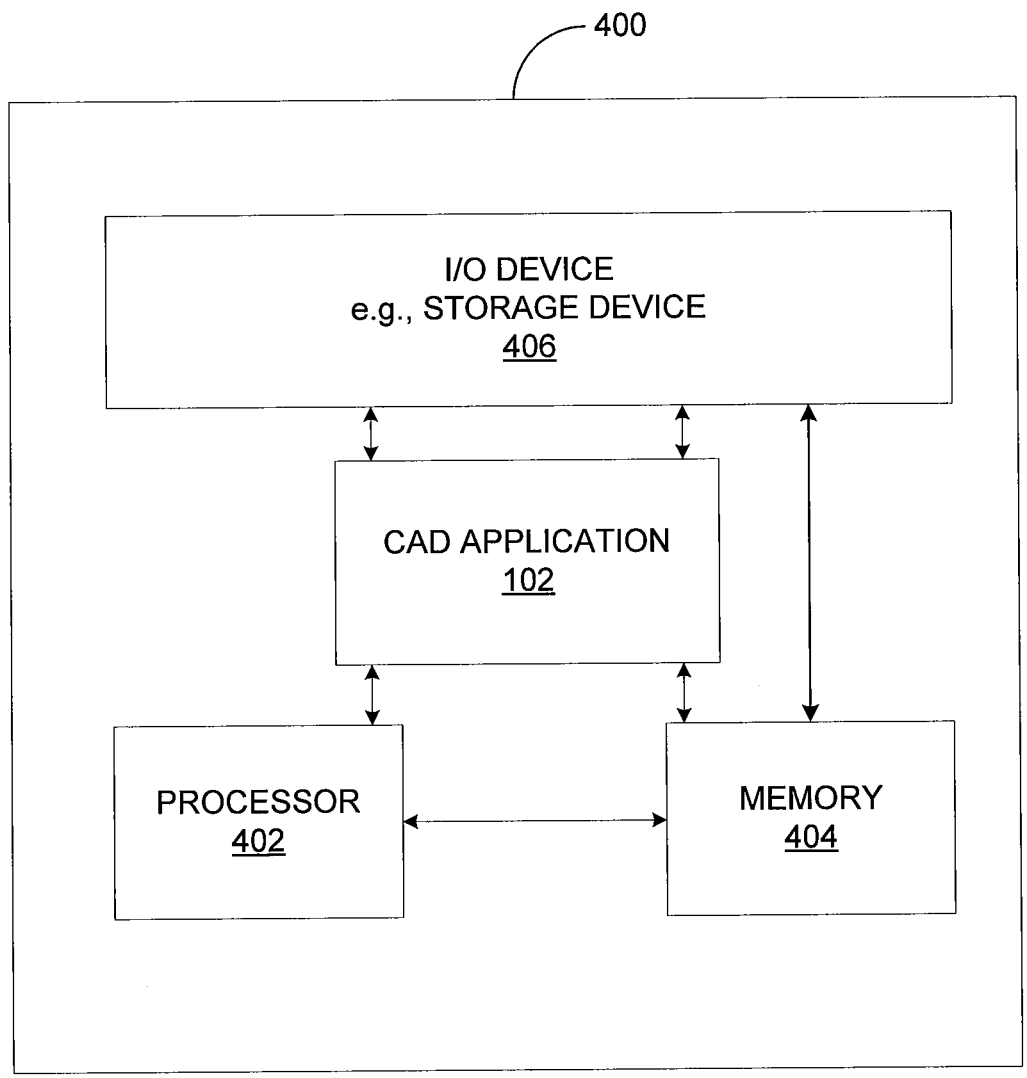
FIG. 4 illustrates a conceptual block diagram of a general purpose computer configured to implement one or more aspects of the invention.

FIG. 4 illustrates a conceptual block diagram of a general purpose computer configured to implement one or more aspects of the invention. As shown, system 400 includes processor element 402 (e.g., a CPU), memory 404, e.g., random access memory (RAM) and/or read only memory (ROM), CAD application 102, and various input/output devices 406, which may include storage devices, including but not limited to, a tape drive, a floppy drive, a hard disk drive or a compact disk drive, a receiver, a transmitter, a speaker, a display, a speech synthesizer, an output port, and a user input device such as a keyboard, a keypad, a mouse, and the like.

In one embodiment, processor element 402 is a parallel processing engine that is configured to efficiently compute the result of each additional parameter value in parallel. An example of such hardware is a multi-core central processing unit (CPU), a graphics processing unit (GPU), an application-specific integrated circuit (ASIC), a field-programmable gate array (FPGA), or any other processing unit that is configured to execute instructions related to computing different results of each additional parameter value in parallel.

In sum, collisions between agents traversing different lanes of a multi-lane path are avoided by keeping track, per agent, of the speeds and locations of neighboring agents in a perception data structure. At each frame, the perception data structure corresponding to a particular agent is analyzed to identify any projected collisions. If the perception data structure indicates that the agent is projected to collide with another agent, then a collision avoidance operation is performed to avoid the collision. A collision avoidance operation includes either modifying the speed of the agent or the lane of the agent to avoid the collision.

One advantage of the disclosed technique is that the motion of an agent in a crowd simulation is dynamically corrected based on the locations and speeds of neighboring agents on a multi-lane path. The agent, therefore, avoids collisions with other neighboring agents. Consequently, the simulation appears more realistic because the agents in the simulation appear to self-correct their movements based on predicted collisions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for avoiding collisions between a plurality of objects traversing a multi-lane path included in an animation, the method comprising:
    assigning a different lane coordinate to each object in the plurality of objects, wherein the lane coordinate assigned to a first object identifies a first lane of the multi-lane path and a location on the first lane that the first object currently occupies;
    identifying a set of neighboring objects associated with the first object traversing the first lane, wherein each neighboring object in the set of neighboring objects traverses a particular lane of the multi-lane path and is within a pre-determined distance of the first object;
    computing, via a processor, a different collision relationship between the first object and each neighboring object in the set of neighboring objects based on a speed of the first object and a speed of the neighboring object, wherein the collision relationship between the first object and a particular neighboring object indicates whether the first object is projected to collide with the particular neighboring object;
    determining, based on a first collision relationship between the first object and a first neighboring object in the set of neighboring objects, that the first object is projected to collide with the first neighboring object; and
    performing a collision avoidance operation to prevent the first object from colliding with the first neighboring object.

2. The method of claim 1, wherein identifying the set of neighboring objects comprises comparing the lane coordinates assigned to the first object with lane coordinates assigned to the first neighboring object to determine that the first neighboring object is less than the pre-determined distance from the first object.

3. The method of claim 1, wherein the first collision relationship indicates a projected collision time between the first object and the first neighboring object, and determining that the first object is projected to collide with the first neighboring object comprises determining that the projected collision time is less than a pre-determined threshold.

4. The method of claim 1, wherein performing a collision avoidance operation comprises computing a new speed for the first object that prevents the first object from colliding with the first neighboring object.

5. The method of claim 4, wherein a second neighboring object in the set of neighboring objects traverses the first lane, and wherein computing the new speed comprises determining that the first object is not projected to collide with the second neighboring object when the first object travels at the new speed.

6. The method of claim 1, wherein performing a collision avoidance operation comprises computing a new lane assignment for the first object that causes the first object to pass into a second lane of the multi-lane path to avoid colliding with the first neighboring object.

7. The method of claim 6, wherein a second neighboring object in the set of neighboring objects traverses the second lane, and wherein computing the new lane assignment comprises determining, based on a second collision relationship between the first object and the second neighboring object, that the first object can pass into the second lane without colliding with the second neighboring object.

8. The method of claim 1, further comprising re-computing the first collision relationship after the collision avoidance operation is performed.

9. The method of claim 1, wherein performing the collision avoidance operation comprises:
   determining if a time required for the first object to pass into a second lane of the multi-lane path is less than a time until the first object is projected to collide with the first neighboring object; and
   if the time required for the first object to pass into the second lane of the multi-lane path is less than the time until the first object is projected to collide with the first neighboring object, then causing the first object to pass into the second lane of the multi-lane path to avoid colliding with the first neighboring object, or
   if the time required for the first object to pass into the second lane of the multi-lane path is greater than the time until the first object is projected to collide with the first neighboring object, then causing the first object to pass into a third lane of the multi-lane path to avoid colliding with the first neighboring object.

10. A non-transitory computer readable medium for storing instructions that, when executed by a processor, cause the processor to prevent collisions between a plurality of objects traversing a multi-lane path included in an animation, by performing the steps of:
   assigning a different lane coordinate to each object in the plurality of objects, wherein the lane coordinate assigned to a first object identifies a first lane of the multi-lane path and a location on the first lane that the first object currently occupies;
   identifying a set of neighboring objects associated with the first object traversing the first lane, wherein each neighboring object in the set of neighboring objects traverses a particular lane of the multi-lane path and is within a pre-determined distance of the first object;
   computing a different collision relationship between the first object and each neighboring object in the set of neighboring objects based on a speed of the first object and a speed of the neighboring object, wherein the collision relationship between the first object and a particular neighboring object indicates whether the first object is projected to collide with the particular neighboring object;
   determining, based on a first collision relationship between the first object and a first neighboring object in the set of neighboring objects, that the first object is projected to collide with the first neighboring object; and
   performing a collision avoidance operation to prevent the first object from colliding with the first neighboring object.

11. The non-transitory computer readable medium of claim 10, wherein identifying the set of neighboring objects comprises comparing the lane coordinates assigned to the first object with lane coordinates assigned to the first neighboring object to determine that the first neighboring object is less than the pre-determined distance from the first object.

12. The non-transitory computer readable medium of claim 10, wherein the first collision relationship indicates a projected collision time between the first object and the first neighboring object, and determining that the first object is projected to collide with the first neighboring object comprises determining that the projected collision time is less than a pre-determined threshold.

13. The non-transitory computer readable medium of claim 10, wherein performing a collision avoidance operation comprises computing a new speed for the first object that prevents the first object from colliding with the first neighboring object.

14. The non-transitory computer readable medium of claim 13, wherein a second neighboring object in the set of neighboring objects traverses the first lane, and wherein computing the new speed comprises determining that the first object is not projected to collide with the second neighboring object when the first object travels at the new speed.

15. The non-transitory computer readable medium of claim 10, wherein performing a collision avoidance operation comprises computing a new lane assignment for the first object that causes the first object to pass into a second lane of the multi-lane path to avoid colliding with the first neighboring object.

16. The non-transitory computer readable medium of claim 15, wherein a second neighboring object in the set of neighboring objects traverses the second lane, and wherein computing the new lane assignment comprises determining, based on a second collision relationship between the first object and the second neighboring object, that the first object can pass into the second lane without colliding with the second neighboring object.

17. The non-transitory computer readable medium of claim 10, further comprising re-computing the first collision relationship after the collision avoidance operation is performed.

18. The non-transitory computer readable medium of claim 10, wherein performing the collision avoidance operation comprises:
   determining if a time required for the first object to pass into a second lane of the multi-lane path is less than a time until the first object is projected to collide with the first neighboring object; and
   if the time required for the first object to pass into the second lane of the multi-lane path is less than the time until the first object is projected to collide with the first neighboring object, then causing the first object to pass into the second lane of the multi-lane path to avoid colliding with the first neighboring object, or
   if the time required for the first object to pass into the second lane of the multi-lane path is greater than the time until the first object is projected to collide with the first neighboring object, then causing the first object to pass into a third lane of the multi-lane path to avoid colliding with the first neighboring object.

19. A computer system, comprising:
a memory; and
a processor configured to:
   assigning a different lane coordinate to each object in the plurality of objects, wherein the lane coordinate assigned to a first object identifies a first lane of the multi-lane path and a location on the first lane that the first object currently occupies;
   identify a set of neighboring objects associated with the first object traversing the first lane, wherein each neighboring object in the set of neighboring objects traverses a particular lane of the multi-lane path and is within a pre-determined distance of the first object,
   compute a different collision relationship between the first object and each neighboring object in the set of neighboring objects based on a speed of the first object and a speed of the neighboring object, wherein the collision relationship between the first object and a particular neighboring object indicates whether the first object is projected to collide with the particular neighboring object,
   determine, based on a first collision relationship between the first object and a first neighboring object in the set of neighboring objects, that the first object is projected to collide with the first neighboring object, and
   perform a collision avoidance operation to prevent the first object from colliding with the first neighboring object.

20. The computer system of claim 19, wherein the processor is configured to perform the collision avoidance operation by:
   determining if a time required for the first object to pass into a second lane of the multi-lane path is less than a time until the first object is projected to collide with the first neighboring object; and
   if the time required for the first object to pass into the second lane of the multi-lane path is less than the time until the first object is projected to collide with the first neighboring object, then causing the first object to pass into the second lane of the multi-lane path to avoid colliding with the first neighboring object, or
   if the time required for the first object to pass into the second lane of the multi-lane path is greater than the time until the first object is projected to collide with the first neighboring object, then causing the first object to pass into a third lane of the multi-lane path to avoid colliding with the first neighboring object.

* * * * *